US011970012B2

(12) United States Patent
Hasegawa

(10) Patent No.: US 11,970,012 B2
(45) Date of Patent: Apr. 30, 2024

(54) INKJET PRINTING DEVICE

(71) Applicant: Ken Hasegawa, Kanagawa (JP)

(72) Inventor: Ken Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 92 days.

(21) Appl. No.: 17/930,938

(22) Filed: Sep. 9, 2022

(65) Prior Publication Data

US 2023/0091206 A1 Mar. 23, 2023

(30) Foreign Application Priority Data

Sep. 13, 2021 (JP) ................................ 2021-148765

(51) Int. Cl.
*B41J 2/21* (2006.01)

(52) U.S. Cl.
CPC .................................. *B41J 2/2103* (2013.01)

(58) Field of Classification Search
CPC ..................................................... B41J 2/2103
See application file for complete search history.

(56) References Cited

U.S. PATENT DOCUMENTS

2014/0009533 A1* 1/2014 Furuta .................. B41J 2/16585 347/33
2015/0252204 A1 9/2015 Hasegawa
2016/0177116 A1 6/2016 Katsuragi et al.
2019/0284413 A1 9/2019 Hasegawa
2021/0277262 A1 9/2021 Hasegawa

FOREIGN PATENT DOCUMENTS

JP 11-091088 4/1999
JP 2002264319 A * 9/2002 .......... B41J 11/0065
JP 2005-068439 3/2005
JP 2005068439 A * 3/2005 ........... C09D 11/322
JP 2020-128030 8/2020

* cited by examiner

*Primary Examiner* — Justin Seo
(74) *Attorney, Agent, or Firm* — Grüneberg and Myers PLLC

(57) ABSTRACT

The inkjet printing device includes a dark ink container containing a dark ink of a color, a light ink container containing a light ink of the color, a dark ink discharging nozzle group for discharging the dark ink, and a light ink discharging nozzle group for discharging the light ink, wherein the light ink discharging group is disposed upstream of the dark ink discharging group in a sub-scanning direction, wherein the following Relationship 1 is satisfied: 10/100≤a ratio of a pigment content in the light ink to a pigment content in the dark ink≤40/100 Relationship 1.

3 Claims, 6 Drawing Sheets

INKJET PRINTING DEVICE

CROSS-REFERENCE TO RELATED APPLICATIONS

This patent application is based on and claims priority pursuant to 35 U.S.C. § 119 to Japanese Patent Application Nos. 2021-148765, filed on Sep. 13, 2021 in the Japan Patent Office, the entire disclosure of which is hereby incorporated by reference herein.

BACKGROUND

Technical Field

The present disclosure relates to an inkjet printing device.

Description of the Related Art

Inkjet printing is now widespread because color images can be readily produced with low running costs.

The color images are formed with an ink set of three color inks of a yellow (Y) ink composition, a magenta (M) ink composition, and a cyan (C) ink composition or an ink set of four color inks including a black (K) ink composition in addition to the three ink compositions.

In addition, another type of ink set has been recently developed. It has multiple pairs of inks, each pair having the same color inks with different color concentrations, dark and light color inks. One of such ink sets includes four dark color inks of K, C, M, and Y and four light color inks of light black (Lk), light cyan (Lc), light magenta (Lm), and light yellow (Ly).

Since an ink jet printing device expresses the shade of an image by the dot density, dots are sparse in light color portions, so that the image looks rough. Such an image is referred to as "granular". To lower the level of this graininess, pairs of dark and light inks of the same color obtained by adjusting the concentration of the coloring material have been used, which is, however, not satisfactory.

SUMMARY

According to embodiments of the present disclosure, an inkjet printing device is provided which includes a dark ink container containing a dark ink of a color, a light ink container containing a light ink of the color, a dark ink discharging nozzle group for discharging the dark ink, and a light ink discharging nozzle group for discharging the light ink, wherein the light ink discharging group is disposed upstream of the dark ink discharging group in a sub-scanning direction, wherein the following Relationship 1 is satisfied: 10/100≤a ratio of a pigment content in the light ink to a pigment content in the dark ink≤40/100 Relationship 1.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
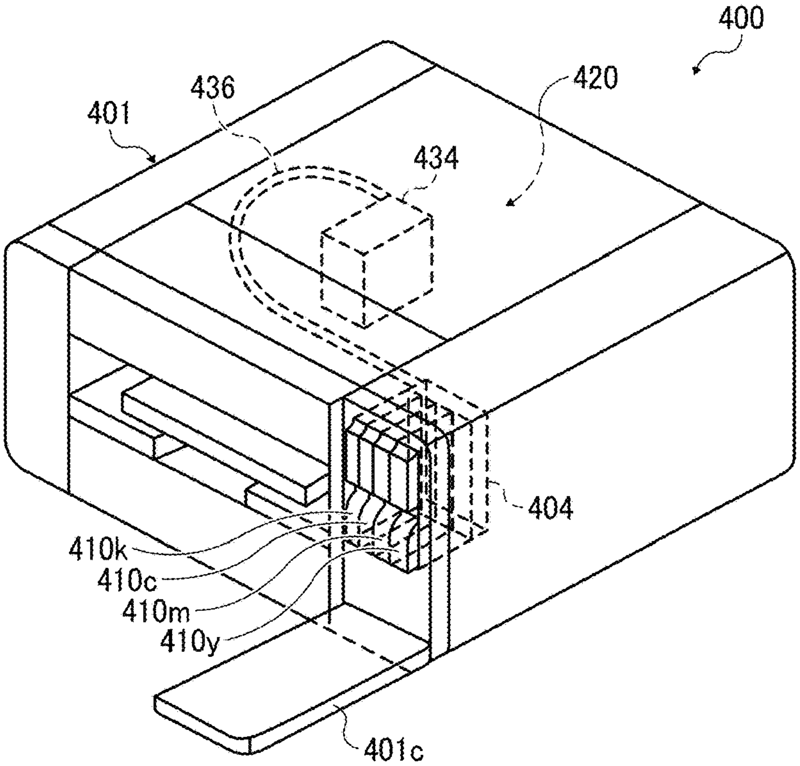
FIG. 1 is a schematic diagram illustrating an example of the inkjet printing device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The inkjet printing device of the present disclosure produces images with less graininess.

The inkjet printing device of the present disclosure applies to a printing medium inks of dark ink and light ink of the same color with a different color content or concentration. The coloring materials such as pigments in the dark ink and the light ink are not necessarily the same.

The inkjet printing device includes a dark ink container containing a dark ink of a color, a light ink container containing a light ink of the color, a dark ink discharging nozzle group for discharging the dark ink, and a light ink discharging nozzle group for discharging the light ink, wherein the light ink discharging group is disposed upstream of the dark ink discharging group in a sub-scanning direction, wherein the following Relationship 1 is satisfied:

10/100≤a ratio of a pigment content in the light ink to a pigment content in the dark ink≤40/100 Relationship 1.

The number of the dark ink discharging nozzle group and the light ink discharging nozzle group that are disposed in the sub-scanning direction is preferably at least three in total.

The dark ink preferably includes at least one member selected from the group consisting of black ink, cyan ink, magenta ink, and yellow ink while the light ink includes at least one corresponding member selected from the group consisting of gray ink, light cyan ink, light magenta ink, and light yellow ink.

In the present disclosure, the dark ink preferably has a normal pigment content, and the light ink has a pigment content lower than the normal pigment content.

In the present disclosure, the pigment content in the dark ink and the pigment content in the light ink satisfy the following Relationship 1 based on percent by mass. 10/100≤the ratio of the pigment content in the light ink to the pigment content in the dark ink≤40/100 Relationship 1.

In the inkjet printing device of the present disclosure, the ink discharging nozzle group for discharging the light ink is disposed upstream of the ink discharging nozzle group for discharging the dark ink in the sub-scanning direction.

In the present disclosure, the conveyance direction of media for printing is referred to as the sub-scanning direction and the direction perpendicular to the sub-scanning direction is referred to as the main scanning direction.

Each of the dark ink and the light ink in the present disclosure contains water, a resin particle, a coloring material, a water-soluble organic solvent, and other optional substances such as a surfactant, a defoaming agent, and a pH regulator. Each component of the ink is described below.

Coloring Material

The coloring material has no particular limit and includes materials such as a pigment and a dye.

The pigment includes an inorganic pigment or organic pigment. These can be used alone or in combination. Mixed crystal can also be used as the coloring material. Dye and mixed crystal can be used in combination.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1). Specific examples of the pigments for color include, but are not limited to, CI Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, CI Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion (or content) of the coloring material in the ink is preferably from 0.1 to 15 percent by mass and more preferably from 1 to 10 percent by mass to enhance the image density, fixability, and discharging stability.

When a pair of light ink and dark ink of the same color, which is differentiated by color concentration, is used under the following Relationship 1 regulating the pigment content in percent by mass in the dark ink and the light ink, a smooth image with a low graininess can be obtained in the range of from a low gradation to a high gradation.

10/100≤the Ratio of the Pigment Content in the Light Ink to the Pigment Content in the Dark Ink≤40/100 Relationship 1

When the light ink is relatively too light to the dark ink, the ratio of the dark ink increases in all the range of the image density, thereby degrading the graininess of the image. Conversely, in the case where the difference in the pigment content between the light ink and the dark ink is small, the graininess deteriorates in the region of low image density. By satisfying Relationship 1 about the pigment content in percent by mass of the dark ink and of the light ink, the average granularity is optimal in all the range of the entire image density.

Water-Soluble Organic Solvent

The ink related to the present disclosure uses water as solvent. In fact, a water-soluble organic solvent is used to prevent the ink from drying and enhance the dispersion stability. The water-soluble organic solvent can be used alone or a mixture of these can be used in combination.

Specific examples of the water-soluble organic solvent include, but are note limited to, polyols, polyol alkyl ethers, polyol aryl ethers, nitrogen-containing heterocyclic compounds, amides, amines, sulfur-containing compounds, propylene carbonates, and ethylene carbonates.

Specific examples of the polyols include, but are not limited to, glycerin, 1,3-butane diol, 3-methyl-1,3-butane diol, 1,5-pentane diol, 1,6-hexane diol, ethylene glycol, diethylene glycol, triethylene glycol, tetraethylene glycol, polyethylene glycol, polypropylene glycol, dipolypropylene glycol, tripolypropylene glycol, polypropylene glycol, hexylene, glycol, trimethylol ethane, trimethylol propane, 1,2,3-butane triol, 1,2,4-butane triol, 1,2,6-hexane triol, and petryol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrrolidone, N-methyl-2-pyrrolidone, N-hydroxyethyle-2-pyrrolidone, 1,3-dimethylimidazoline, ε-caprolactam, and γ-butylolactone.

Specific examples of the amides include, but are not limited to, acetoamide, dimethylformamide, and diethylacetoamide.

Specific examples of the amines include, but are not limited to, monoethanol amine, diethanol amine, triethanol amine, monoethyl amine, diethylamine, and triethyl amine.

Specific examples of the sulfur-containing compounds include, but are not limited to, dimethyl sulphoxide, sulfolane, and thiodiethanol.

Of these water-soluble organic solvents, glycerin, diethylene glycol, diethylene glycol, 1,3-butane diol, and 3-methyl-1,3-butane diol are particularly preferable. These are excellent in terms of preventing defective spraying attributable to solubility and moisture evaporation. It is also possible to manufacture an ink having excellent storage stability and discharging stability by using such solvents.

The ink of the present disclosure can be manufactured by using other optional water-soluble organic solvents such as sugars and their derivatives in combination with the water-soluble organic solvents mentioned above. Sugar groups are used to enhance the dry hardiness. They include monosaccharides, disaccharides, oligosaccharides (including triaccharides and tetrasaccharides), polysaccharides, and their derivatives.

Specific examples include, but are not limited to, glucose, mannose, fructose, ribose, xylose, trehalose, and maltotriose. Polysaccharides refer to sugars in a broad sense and contain materials present widely in nature, including α-cyclodextrine and cellulose.

The derivative of sugar groups includes the sugar groups and oxidized sugars. Of these, sugar alcohols are preferable and specific examples thereof include, but are not limited to, maltitol and sorbit.

The proportion of the sugar groups to the entire ink is preferably from 0.1 to 40 percent by mass and more preferably from 0.5 to 30 percent by mass.

Surfactant

The surfactant is not particularly limited and can be suitably selected to suit to a particular application as long as the type of a coloring material and the combinational use with a humetcant and permeating agent do not have an adverse impact on the dispersion stability of ink. Fluorochemical surfactants and silicone-based surfactants, which have a small surface tension and high level of leveling, are suitable for printing on a medium. Fluorochemical surfactants are particularly preferable.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the perfluoroalkyl phosphoric acid ester compounds include, but are not limited to, a perfluoroalkyl phosphoric acid ester and a salt of perfluoroalkyl phosphoric acid esters.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Such synthetic fluoro-surfactants can be synthesized or procured.

Specific examples of the procured surfactant include, but are not limited to, Surflon series including S-111, S-112, S-113, S-121, S-131, S-132, S-141, and S-145, manufactured by AGC Inc. Fluorad series including FC-93, FC-95, FC-98, FC-329, FC-135, FC-170C, FC-430, and FC-431, manufactured by SUMITOMO 3M Limited, Megaface series including F-470, F1405, and F-474, manufactured by DIC Corporation, Zonyl TBS, FSP, FSA, FSN, FSO-100, FSO, FSO-300, and UR, manufactured by E.I. du Pont de Nemours and Company, FT-110, FT-250, FT-252, FT-400S, FT-150, and FT-400SW, manufactured by NEOS COMPANY LIMITED, and PF-151N, manufactured by OMNOVA SOLUTIONS. Of these, the fluorochemical surfactant represented by the Chemical Formula 1 below is preferable.

$C_nF_{2n+1}$—$CH_2CH(OH)CH_2O$—$CH_2CH_2O)_a$—Y Chemical Formula 1

In Chemical Formula 1, n represents an integer of from 2 to 6 and a represents an integer of from 15 to 50. Y represents —$C_bH2_b+1$, where b represents an integer of from 11 to 19 or —$(CH_2CH(OH)CH_2$—$C_mF_{2m+1}$, where m represents an integer of from 2 to 6. Specific structures are illustrated below.

$C_3F_7$—$CH_2CH(OH)CH_2O$—$(CH_2CH_2O)_{23}$—$CH_2CH(OH)CH_2$—$C_3F_7$ Chemical Structure 1

$C_4F_9$—$CH_2CH(OH)CH_2O$—$(CH_2CH_2O)_{23}$—$CH_2CH(OH)CH_2$—$C_4F_9$ Chemical Structure 2

$C_4F_9$—$CH_2CH(OH)CH_2O$—$(CH_2CH_2O)_{35}$—$CH_2CH(OH)CH_2$—$C_4F_9$ Chemical Structure 3

$C_4F_9$—$CH_2CH(OH)CH_2O$—$(CH_2CH_2O)_{45}$—$CH_2CH(OH)CH_2$—$C_4F_9$ Chemical Structure 4

$C_6F_{13}$—$CH_2CH(OH)CH_2O$—$(CH_2CH_2O)_{23}$—$CH_2CH(OH)CH_2$—$C_6F_{13}$ Chemical Structure 5

$C_4F_9$—$CH_2CH(OH)CH_2O$—$(CH_2CH_2O)_{25}$—$CH_2CH(OH)CH_2$—$C_{16}F_{33}$ Chemical Structure 6

Particularly preferable of these is the surfactant having the following structures.

$C_4F_9—CH_2CH(OH)CH_2O—(CH_2CH_2O)_{23}—CH_2CH(OH)CH_2—C_4F_9$ Chemical Structure 2

The fluorochemical surfactant having the structure above is friendly to the environment because it is free of perfluorooctanic sulphonic acid (PFOS) and perfluorooctaninc acid (PFOA)

The silicone-based surfactant is not particularly limited and can be suitably selected to a particular application. Of these, surfactants not decomposable in a high pH environment are preferable. Examples include, but are not limited to, side chain modified polydimethyl siloxane, both terminal-modified polydimethyl siloxane, one-terminal-modified polydimethyl siloxane, and side-chain-both-terminal-modified polydimethyl siloxane. Silicone-based surfactants having a polyoxyethylene group or a polyoxyethylene polyoxypropylene group as a modification group are particularly preferable because such an aqueous surfactant demonstrates good properties.

The silicone-based surfactant can be synthesized or procured. The products are available from companies including BYK Chemie GmbH, Shin-Etsu Silicone Co., Ltd., and Dow Corning Toray Co., Ltd.

It is possible to use a polyether-modified silicone-based surfactant as the silicone-based surfactant. A specific example is a compound in which a polyalkylene oxide structure is introduced into the side chain of the Si site of dimethyl silooxane.

The polyether-modified siloxane compound can be synthesized or procured.

Specific examples of the product include, but are not limited to, KF-618, KF-642, and KF-643, manufactured by Shin-Etsu Chemical Co., Ltd.

Anionic surfactants, nonionic surfactants, and amphoteric surfactants can be used other than the fluorochemical surfactant and silicone-based surfactant mentioned above.

Specific examples of the anionic surfactants include, but are not limited to, polyoxyethylene alkylether acetates, dodecyl benzene sulfonates, succinic acid ester sulfonates, laurates, and polyoxyethylene alkylether sulfates.

Specific examples of the nonionic surfactants include, but are not limited to, acetylene glycol-based surfactants, polyoxyethylene alkyl ethers, polyoxyethylene alkylphenyl ethers, polyoxyethylene alkylesters, and polyoxyethylene sorbitane aliphatic acid esters.

Specific examples of acetylene glycol-based surfactants include, but are not limited to, 2,4,7,9-tetramethyl-5-desine-4,7-diol, 3,6-dimethyl-4-octine-3,6-diol, and 3,5-dimethyl-1-hexine-3-ol.

Specific examples of the product include, but are not limited to, Surfynol series including 104, 82, 465, 485, and TG, manufactured by Air Products Limited.

Specific examples of amphoteric surfactants include, but are not limited to, lauryl amino propionic acid salts, lauryl dimethyl betaine, steallyldimethylbetaine, lauryl dihydroxyethyl betaine, lauryldimethyl amineoxide, myristyl dimethylamine oxide, stearyldimethylamine oxide, dihydroethyl lauryl amineoxide, polyoxyethylene palm oil alkyldimethyl amineoxide, dimethylalkyl (palm) betaine, and dimethyl laurylbetaine. Those products are available from companies such as Nikko Chemicals Co., Ltd., NIHON EMULSION Co., Ltd., NIPPON SHOKUBAI CO., LTD., TOHO Chemical Industry Co., Ltd., Kao Corporation, ADEKA CORPORATION, Lion Corporation, AOKI OIL INDUSTRIAL CO., LTD., and Sanyo Chemical Industries, Ltd.

These surfactants can be used alone or in combination. For a surfactant not readily soluble alone in ink, the insoluble surfactant can be dissolved by mixing with other surfactants and stably present in some occasions.

The proportion of the surfactant in the ink is preferably from 0.01 to 4 percent by mass and more preferably from 0.1 to 1 percent by mass. When the proportion is less than 0.01 percent by mass, the surfactant may not demonstrate its effect. When the content is greater than 4 percent by mass, ink penetrates a printing medium more than necessary, resulting in a decrease in the image density and occurrence of strike-through.

Defoaming Agent

Bubbles occur in the ink when a fluorochemical surfactant is used since the fluorochemical surfactant has an extremely high surface activation capability. These produced bubbles remain even when a commonly used silicone-based surfactant is added. Ink may not be properly discharged because of the foams. Therefore, in the present embodiments, one of N-octyl-2-pyrroridone, 2,4,7,9-tetramethyldecane-4,7-diol, 2,5,8,11-tetramethyldodecane-5,8-diol is added. The combinational use of one of these defoaming agents and the fluorochemical surfactant mentioned above reduces the occurrence of bubbles, thereby solving the problem caused by bubbles.

The ratio between a fluorochemical surfactant and a defoaming agent determines the surface tension of the ink in the present disclosure. The content of the fluorochemical surfactant is increased when reducing the surface tension of the ink is necessary in accordance with the type of printing media. However, since an increase in the ratio of a fluorochemical surfactant invites the problem of bubbles, the proportion of the fluorochemical surfactant to the entire of the fluorochemical surfactant and a defoaming agent is preferably 40 percent by mass or less and more preferably 30 percent by mass or less.

Resin Particle

The resin particles used have film-forming property. Film-forming represents a feature that resin film is formed as the moisture in an aqueous emulsion of resin particles dispersed in water evaporates.

Such resin particles form film when the volatile component in an ink evaporates, and the film plays a role of firmly attaching the coloring material in the ink to a printing medium. Resultantly, images having excellent abrasion resistance and water resistance are obtained.

The type of the resin particles is not particularly limited. A combination of polyurethane resin and polyacrylic resin leads to achieving good fixability.

The mass content (in percent by mass) of the solid resin portion in the light ink is preferably not less than that in the dark ink in the present disclosure, i.e., satisfying the following Relationship 2:

The Concentration of the Solid Resin Portion in the Light Ink≥the Concentration of the Solid Resin Portion in the Dark Ink Relationship 2

Both inks are adjusted to have suitable viscosity. The liquid compositions, particularly the aqueous organic solvent, of the dark ink and the light ink are preferably similar to each other. The light ink is required to increase the solid portion, preferably the solid resin portion other than pigments, to be on par with the viscosity of the dark ink because the light ink contains a less amount of pigment.

The resin preferably has a minimum film-forming temperature of 30 degrees C. or lower and more preferably 10 degrees C. or lower in order for the resin particle to form film at room temperature. The minimum film-forming temperature refers to the temperature below which continuous and transparent film is not formed by thinly casting an emulsion of resin particles dispersed in water on a plate of metal such as aluminum, followed by raising the temperature of the emulsion. One of such resin particles is Landy PL Series of MIYOSHI OIL & FAT CO., LTD.

The resin particle preferably has a volume average particle diameter of from 5 to 200 nm and more preferably from 10 to 100 nm.

The resin particle has a single particle structure. One way of obtaining such a structure is as follows. Emulsion particles having an alkoxysilyl group adhere to each other attributable to the moisture evaporation in the film forming process and contact the moisture remaining therein. This contact invites hydrolysis, forming a silanol group. If silanol groups remain, alkoxysilyl groups or silanol groups are allowed to react each other and form a strong cross-linking structure owing to the siloxane bonding. Under such a condition that reactive functional groups are present together in resin particles, these functional groups are allowed to react and form a network structure during the film-forming without adding a curing agent.

Resin particles can be obtained by a known method. One way of its preparation is to allow emulsion polymerization reaction of unsaturated vinyl monomer or resin in water containing a polymerization catalyst and emulsifier. The proportion of the resin particles in an ink is preferably from 0.5 to 20 percent by mass and more preferably from 1 to 5 percent by mass. A proportion of less than 0.5 percent by mass may fail to enhance the abrasion resistance and water resistance. A proportion surpassing 20 percent by mass invites a discharging problem due to an increase in viscosity and fixation of the resin components caused by drying.

Other Components

The ink of the present disclosure may furthermore optionally contain a known penetrant, pH regulator, and preservatives and fungicides in addition to the components mentioned above.

Specific examples of the penetrant include, but are not limited to, a polyol compound having 8 to 11 carbon atoms and a glycol ether compounds having 8 to 11 carbon atoms. These are partially water-soluble compounds having a solubility of from 0.1 to 4.5 percent by mass at 25 degrees C. in water. Such agents accelerate the speed of permeating a printing medium while preventing the occurrence of bleeding.

Specific examples of the polyol compound having 8 to 11 carbon atoms include, but are not limited to, 2-ethyl-1,3-hexanediol, 2,2,4-trimethyl-1,3-pentanediol, and 1,2-octane diol.

Specific examples of the glycol compounds include, but are not limited to, polyol alkylether compounds and polyol aryl ether compounds.

Specific examples of the polyol alkylethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

These penetrants have a higher boiling point than that of water and liquid at 25 degrees C. The proportion of the penetrant in an aqueous color ink is preferably from 0.1 to 10 percent by mass and more preferably from 0.5 to 5 percent by mass, A pH regulator is preferably added to a mix-kneaded liquid dispersion together with additives such as a humectant and a penetrant, rather than being added in the middle of kneading and dispersing a pigment in water together with a dispersant. This is because some of the pH regulators may break this dispersion.

Specific examples of the pH regulator include, but are not limited to, alcohol amines, hydroxides of alkali metal elements, ammonium hydroxides, phosphonium hydroxides, and alkali metal carbonates.

Specific examples of the alcohol amines include, but are not limited to, diethanolamine, triethanolamine, and 2-amino-2-ethyl-1,3-propanediol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Specific examples of the preservatives and fungicides include, but are not limited, dehydrosodium acetate, sodium sorbinate, 2-pyridine thiol-1-oxide sodium, sodium benzoate, and pentachlorophenol sodium.

Specific examples of the corrosion inhibitors include, but are not limited to, acid sulfite, thiosodium sulfate, ammonium thiodiglycolate, diisopropyl ammonium nitrite, pentaerythritol tetranitride, and dicyclohexyl ammonium nitrite.

Printing Device and Printing Method

The ink in the present disclosure can be suitably applied to various printing devices employing inkjet printing, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the printing device and the printing method respectively represent a device capable of discharging ink and liquids such as processing fluids to a printing medium and a method of printing utilizing such a device. The printing medium refers to an item to which ink or processing fluids can be temporarily or permanently attached. The printing device may furthermore optionally include a device relating to feeding, conveying, and ejecting a printing medium and other devices referred to as a pre-processing device and a post-processing device in addition to the head portion for discharging an ink.

The printing device and the printing method may further optionally include a heating device (heater) for use in the heating and a drying device (drier) for use in the drying. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the printing device and the printing method are not limited to those producing meaningful visible images such as text and figures with ink. For example, the printing method and the printing device capable of producing patterns like geometric design and 3D images are included.

In addition, the printing device includes both a serial type device in which the discharging head moves and a line type device in which the discharging head is not moved, unless otherwise specified.

Furthermore, in addition to the desktop type, this printing device includes a device capable of printing images on a wide printing medium having, for example, A0 size, and a continuous printer capable of using continuous paper rolled up in a roll-like form as a printing medium.

Figure 2:
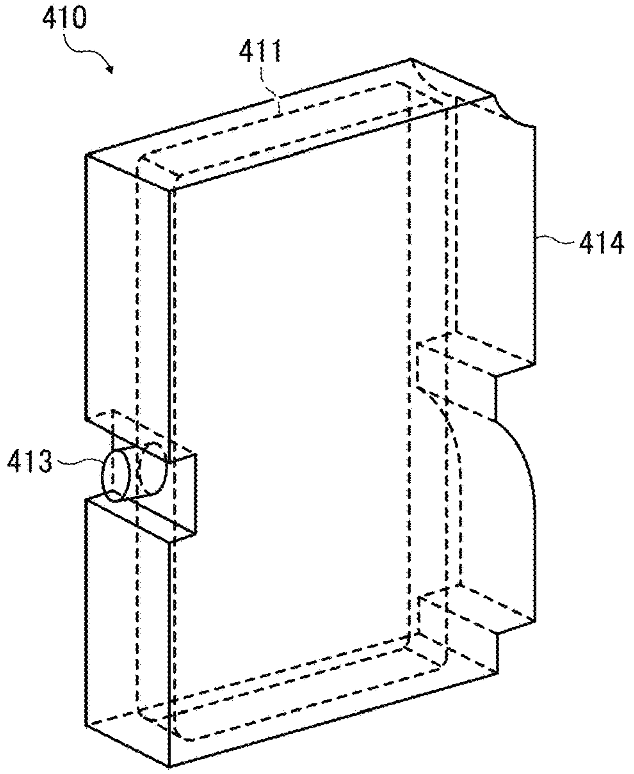
FIG. 2 is a diagram illustrating a perspective view of a tank containing ink according to an embodiment of the present disclosure.

The printing device is described using an example with reference to FIG. 1 and FIG. 2. FIG. 1 is a diagram illustrating a perspective view of the same device. FIG. 2 is a diagram illustrating a perspective view of a tank. An image forming apparatus 400 as an embodiment of the printing device is a serial image forming apparatus. An image forming apparatus 400 includes a mechanical unit 420 in an exterior 401. Each ink accommodating unit (container) 411 of each tank (ink accommodating unit) 410 (410*k*, 410*c*, 410*m*, and 410*y*) for each color of black (K), cyan (C), magenta (M), and yellow (Y) is made of, for example, a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening appearing when a cover 401*c* is opened. The tank 410 is detachably attached to the cartridge holder 404. In this configuration, each ink discharging outlet 413 of the tank 410 communicates with a discharging head 434 for each color via a supplying tube 436 for each color and the ink can be discharged from the discharging head 434 to a recording medium.

Liquid Discharging Device

Figure 3:
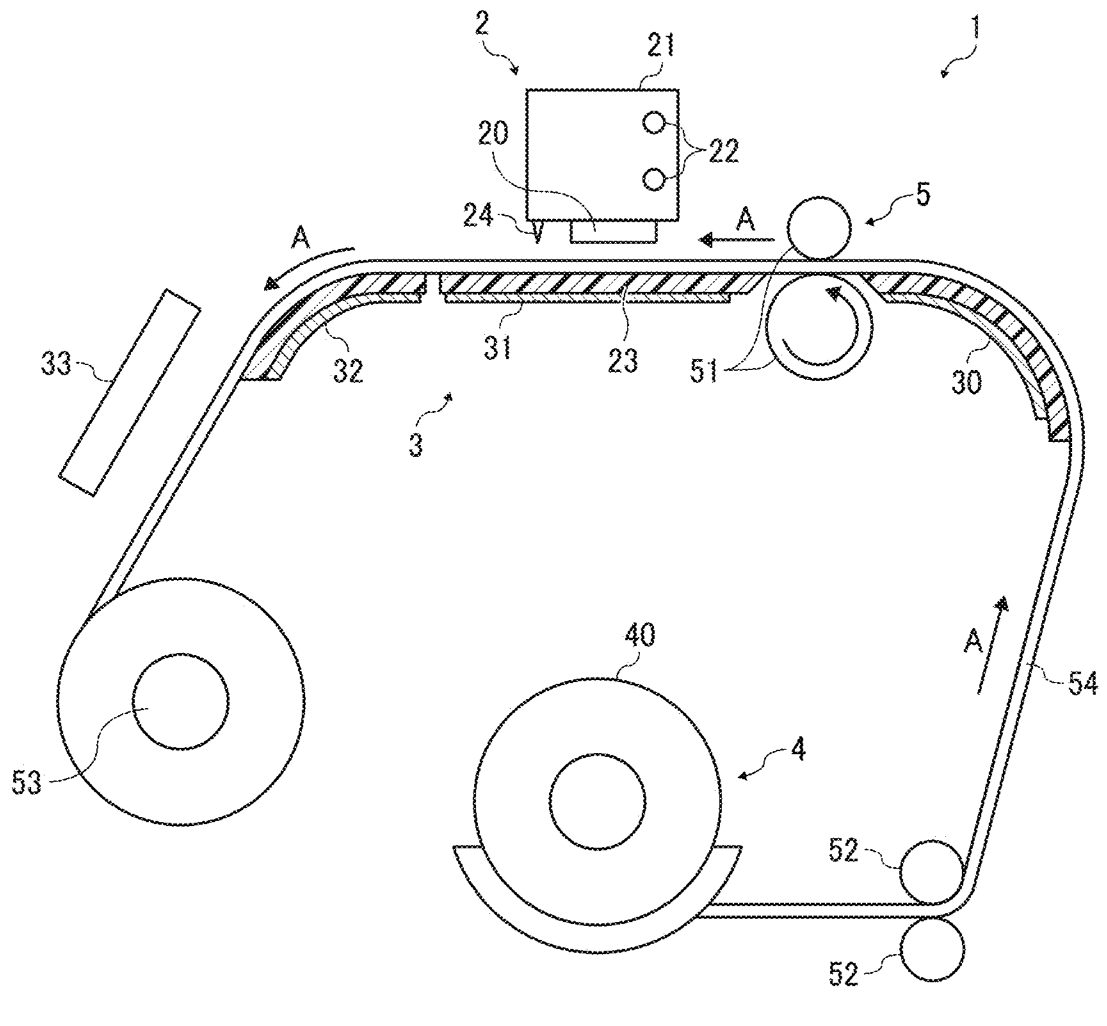
FIG. 3 is a schematic diagram illustrating an example of the inkjet printing device according to an embodiment of the present disclosure.

FIG. 3 is a schematic diagram illustrating the configuration of an inkjet printing device 1. The inkjet printing device 1 as a liquid discharging device is a serial inkjet printing device. As illustrated in FIG. 3, the inkjet printing device 1 includes an image forming unit 2 for printing an image, a drying device 3, a medium accommodating unit 4, and a conveyance mechanism 5. The medium accommodating unit 4 accommodates a roll medium 40 for printing. The medium accommodating unit 4 can accommodate the roll medium 40 having a different length in the width direction. The roll medium 40 can be a non-permeable medium of polyvinyl (PVC) or polyethylene terephthalate (PET) film or a permeable medium such as cloth or synthetic paper.

In the present disclosure, the conveyance direction A of the roll medium 40 is referred to as the sub-scanning direction and the direction perpendicular to the sub-scanning direction is referred to as the main scanning direction.

Figure 4:
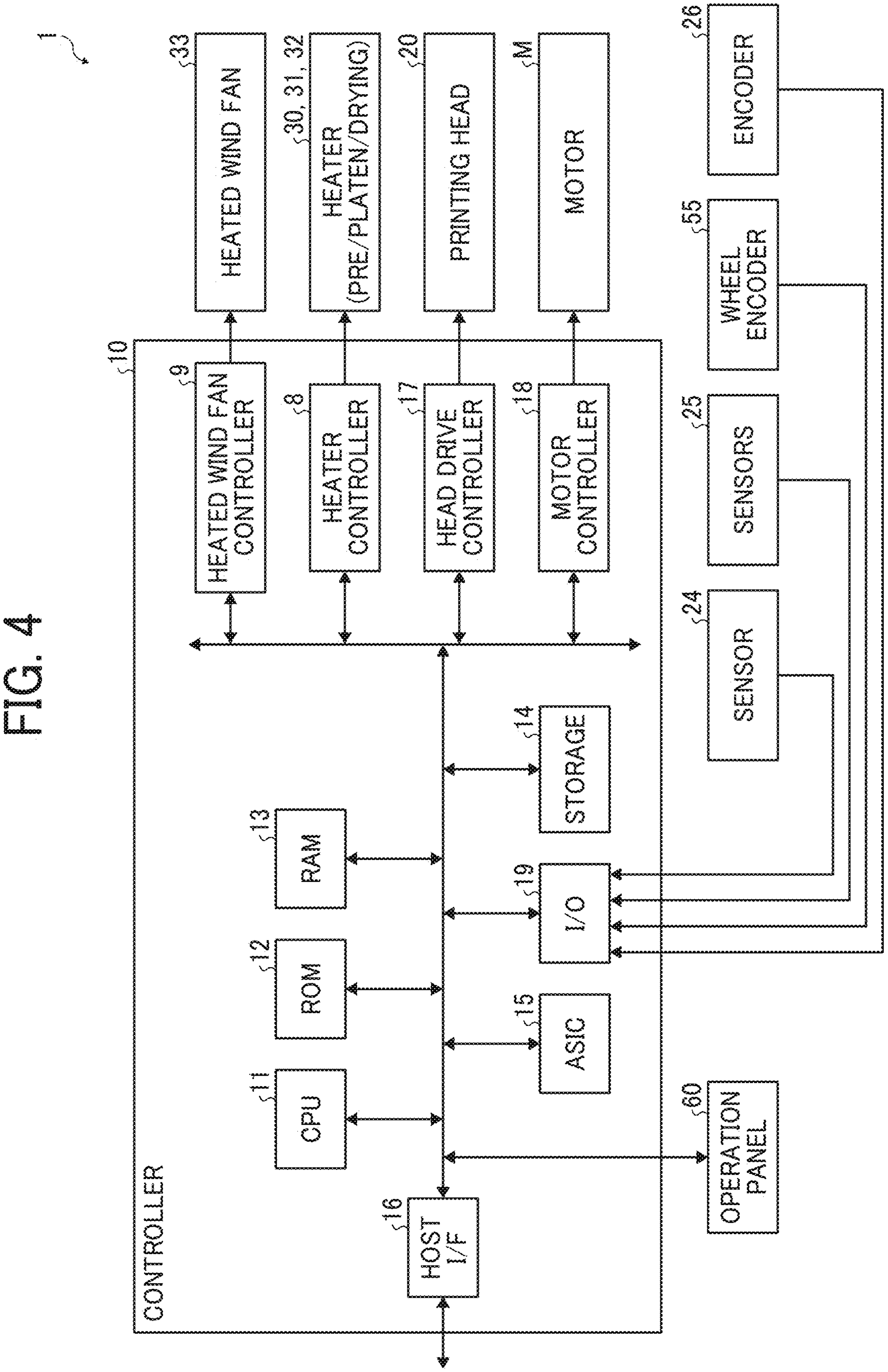
FIG. 4 is a block diagram illustrating an example of a control mechanism of an inkjet printing device.

The conveyance mechanism 5 constitutes a roll-to-roll conveying device. The conveyance mechanisms includes a pair of nip rollers 51, a pair of driven rollers 52, and a reeling roller 53 on a conveyance route 54 of the roll medium 40. The nip rollers 51 are disposed upstream of the image forming unit 2 along the conveyance direction A. The nip rollers 51 nip the roll medium 40 and convey it towards the image forming unit 2 by rotating in accordance with the drive of a motor M (FIG. 4). The reeling roller 53 reels up the roll medium 40 after printing by rotating in accordance with the drive of the motor M. The driven rollers 52 rotate following the conveyance of the roll medium 40.

The conveyance mechanism 5 includes a wheel encoder 55 (FIG. 4) for detecting the conveyance speed. The motor M controls the conveyance speed of the conveyance mechanism 5 based on a target value and the detected speed obtained by sampling detected pulses from the wheel encoder 55.

The roll medium 40 accommodated in the medium accommodating unit 4 is conveyed to the image forming unit 2 in accordance with the rotation of the nip rollers 51 via the driven rollers 52. The roll medium 40 that has reached the image forming unit 2 is subjected to priming an image at the image forming unit 2. The roll medium 40 is reeled up by the rotation of the reeling roller 53 after printing.

The image forming unit 2 includes a carriage 21. The carriage 21 is held slidable by guiding rods (guiding rail) 22. The carriage 21 moves on the guiding rods 22 along in the main scanning direction perpendicular to the conveyance direction A of the roll medium 40 in accordance with the drive of the motor M. The carriage 21 moves back and forth in the printable region of the image forming unit 2 to the roll medium 40 the conveyance mechanism 5 conveys in the main scanning region, which is the movable region in the main scanning direction.

The carriage 21 carries a printing head 20 having aligned orifices through which liquid droplets are discharged. The printing head 20 integrally includes a tank for supplying ink to the printing head 20. The printing head 20 may include a tank separately. The printing head 20 serves as a liquid discharging unit for discharging ink droplets of each color of black (K), yellow (Y), magenta (M), and cyan (C) as the printing liquids of process colors. The black (K), yellow (Y), magenta (M), and cyan (C) are inks for image forming. The printing head 20 also discharges white (W) ink droplets as an auxiliary ink applied to a background or a base.

The image forming unit 2 includes a platen 23 that supports the roll medium 40 below the printing head 20 during printing with the printing head 20.

The image forming unit 2 also includes an encoder sheet for detecting the main scanning position of the carriage 21 along the main scanning direction of the carriage 21. The carriage 21 also includes an encoder 26 (FIG. 4). The image forming unit 2 detects the main scanning position of the carriage 21 by reading the encoder sheet with the encoder 26 of the carriage 21.

The carriage 21 includes a sensor 24 that optically detects the end of the roll medium 40 in accordance with the movement of the carriage 21. The detection signal by the sensor 24 is used for calculating the position of the end of the roll medium 40 in the main scanning direction and the width of the roll medium 40.

The drying device 3 includes a pre-heater 30, a platen heater 31, a drying heater 32, and a heated wind fan 33. The pre-heater 30, the platen heater 31, and the drying heater 32 can be be an electric heater using ceramic or nichrome wire.

The pre-heater 30 is disposed upstream of the image forming unit 2 in the conveyance direction A of the roll medium 40. The pre-heater 30 preliminarily heats the roll medium 40 the conveyance mechanism 5 is conveying.

The pre-heater 31 is disposed to the platen 23. The platen heater 31 heats the roll medium 40 where ink droplets are jetted from the nozzles of the printing head 20.

The drying heater 32 is disposed downstream of the image forming unit 2 in the conveyance direction A. The drying heater 32 takes over heating the roll medium 40 on which the image forming unit 2 has printed the image to accelerate drying the ink droplets on the roll medium 40.

The heated wind fan 33 is disposed downstream of the drying heater 32 (image forming unit 2) in the conveyance direction A. The heated wind fan 33 blows heated wind to the printed surface, ink-discharged surface, of the roll medium 40 where the ink has reached. The heated wind fan 33 completely dries the ink on the printed surface of the roll medium 40 while decreasing the humidity in the atmosphere around the printed surface by directly blowing heated wind to the ink.

Due to the heating device 3, the inkjet printing device 1 can print an image on an ink-non-permeable medium such as polyvinylchloride (PVC), polyethylene terephthalate (PET), and acrylic as the roll medium 40.

The printing device 1 moves the carriage 21 back and forth within the width of the roll medium 40. The inkjet printing device can print an image one way or dual way in accordance with the movement of the carriage 21 while discharging ink from the printing head 20. Dual way printing is advantageous and preferable for the inkjet printing device 1 to achieve efficient printing. The action of discharging ink from the printing head 20 while the carriage 21 moves in the main scanning direction is counted as one scan.

The hardware configuration of the inkjet printing device 1 is as follows. FIG. 4 is a block diagram illustrating the configuration of the inkjet printing device 1.

As illustrated in FIG. 4, the inkjet printing device 1 includes a control unit 10 for controlling the entire device. The control unit 10 includes a central processing unit (CPU) 11 as the main part of control, a read only memory (ROM) 12, a random access memory (RAM) 13, a memory 14, and an application specific integrated circuit (ASIC) 15. The ROM 12 stores computer programs and other fixed data that the CPU 11 executes. The RAM 13 temporarily stores items such as image data. The memory 14 is a rewritable non-volatile memory that can hold data even while the power supply of the inkjet printing device 1 is shut off. The ASIC 15 executes image processing of signal processing and rearrangement for image data and input/output signal processing for controlling the entire device.

As illustrated in FIG. 4, the control unit 10 includes a host interface (I/F) 16, a head drive control unit 17, a motor control unit 18, and an I/O 19.

The host I/F 16 transmits and receives image data (print data) and control signals to and from a host via a cable or network. The host connected to the inkjet printing device 1 includes, for example, an information processor such as a home computer, an image reader such as an image scanner, and an imaging device such as a digital camera.

The I/O 19 inputs detected pulses from the encoder 26 and the wheel encoder 55. In addition to the sensor 24, the I/O 19 is connected to sensors 25 such as a humidity sensor and a temperature sensor. The I/O 19 receives the detected pulses from the sensor 24 and the sensor 25.

The head drive control unit 17 drives and controls the printing head 20 and it includes a data transfer unit. The head drive control unit 17 transfers the image data as serial data. The head drive control unit 17 also generates a transfer clock and a latch signal necessary for image data transfer and its determination and a drive waveform used when the printing head 20 discharges droplets. Then the head drive control unit 17 inputs the data such as the generated drive waveform to the drive circuit inside the printing head 20.

The motor control unit 18 drives the motor M. The motor control unit 18 calculates the control value based on the target value provided from the CPU 11 and the detected speed obtained by sampling the detected pulses from the wheel encoder 55. The motor control unit 18 drives the motor M based on the calculated control value via the internal motor drive circuit.

The control unit 10 includes a heater control unit 8 and a heated wind fan control unit 9.

The heater control unit 8 controls the outputs to match the temperatures of the pre-heater 30, the platen heater 31, and the drying heater 32 with the predetermined temperatures.

The temperatures are adjusted in the following manner: the heater control unit 8 acquires temperature information from the temperature sensors provided to each of the heaters 30, 31, and 32; and the heater control unit 8 controls the temperature of each of the heaters 30, 31, and 32 to be the predetermined temperature while monitoring the temperature. When a heater is provided on the tank of the printing head 20 or the ink path, the heater control unit 8 controls this heater in the same manner.

The heated wind fan control unit 9 controls the output of the heated wind fan 33 to blow air at a predetermined temperature in a predetermined air volume.

The control unit 10 is connected to an operation panel 60 where information is input for the inkjet printing device 1 and that displays the information.

The control unit 10 comprehensively controls each unit by the CPU 11 loading a computer program read from the ROM 12 or the memory 14 into the RAM 13, followed by executing the program.

The computer program the inkjet printing device 1 executes in the present embodiment is provided by a computer-readable recording medium such as a CD-ROM, a flexible disk (FD), a CD-R, or a digital versatile disk (DVD) storing a file in an installable or executable format.

The computer program the inkjet printing device 1 in the present embodiment may be downloaded via a network such as the Internet to which a computer storing the program is connected. Also, the computer program the inkjet printing device 1 in the present embodiment may be provided or distributed via a network such as the Internet.

The computer program the inkjet printing device 1 in the present embodiment may be provided by a medium such as a ROM storing the program in advance.

A brief description about the data transfer printing process executed by the control unit 10 of the inkjet printing device 1 is as follows. The CPU 11 of the control unit 10 reads and analyzes image data (print data) in the reception buffer in the host I/F 16, and performs processes such as image processing and data rearrangement processing at the ASIC 15. Then the CPU 11 of the control unit 10 transfers the image data (print data) processed by the ASIC 15 from the head drive control unit 17 to the printing head 20.

Dot pattern data for image outputs are created by, for example, storing font data on the ROM 12 or transferring bit map data converted from the image data by a printer driver on the host to the inkjet printing device 1.

The features of the inkjet printing device 1 is as follows. The inkjet printing device 1 in the present embodiment has the following when inkjet-printing on the roll medium 40, a transparent non-permeable medium.

The inkjet printing device 1 can print an auxiliary layer with an auxiliary ink such as white ink as an underlayer, intermediate layer, or a top layer against an image layer formed with an ink for image forming. Also, the inkjet printing device 1 is to quickly create the auxiliary layer.

Figure 5:
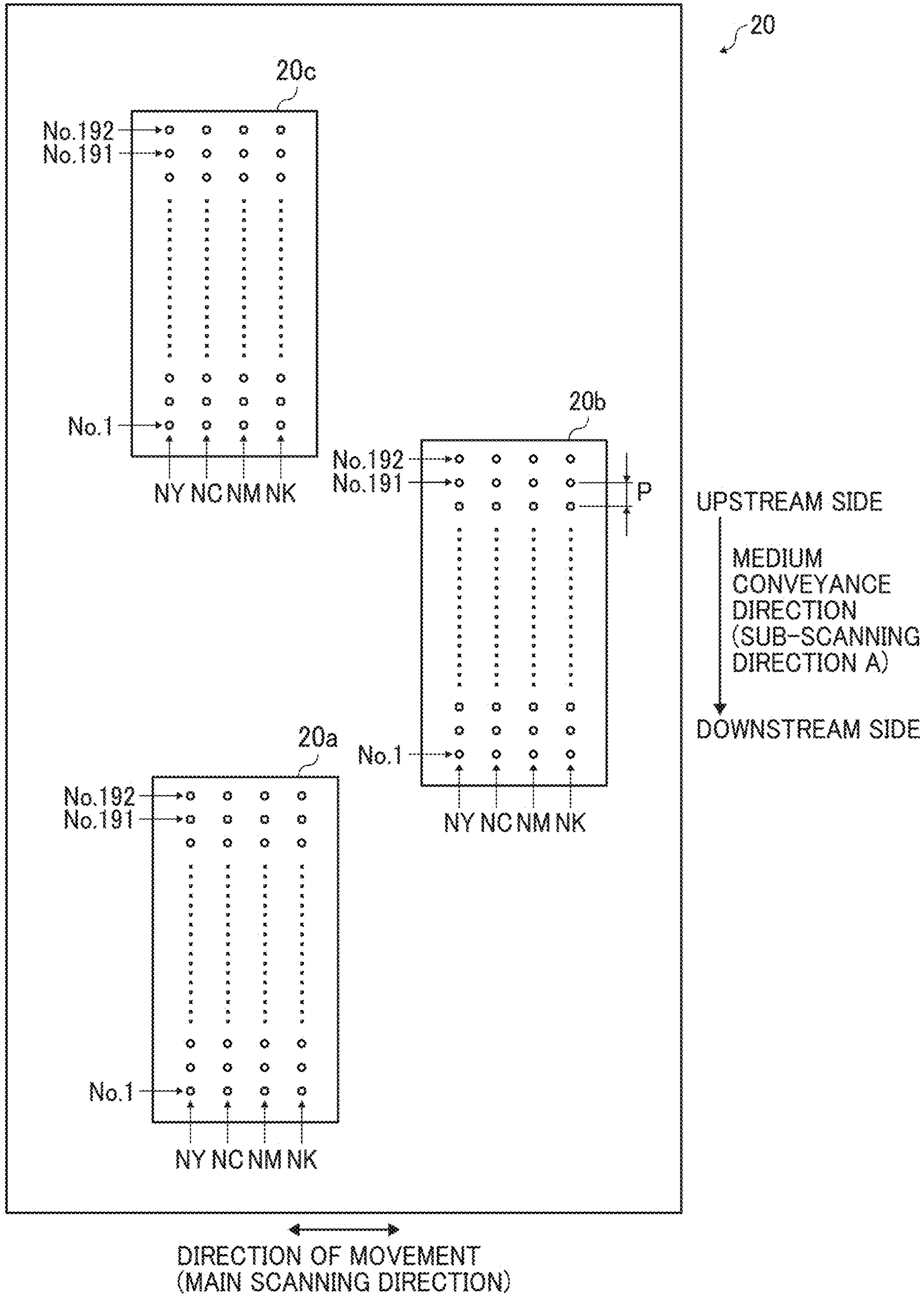
FIG. 5 is a diagram illustrating a plan view of an example of a printing device.
Figure 6:
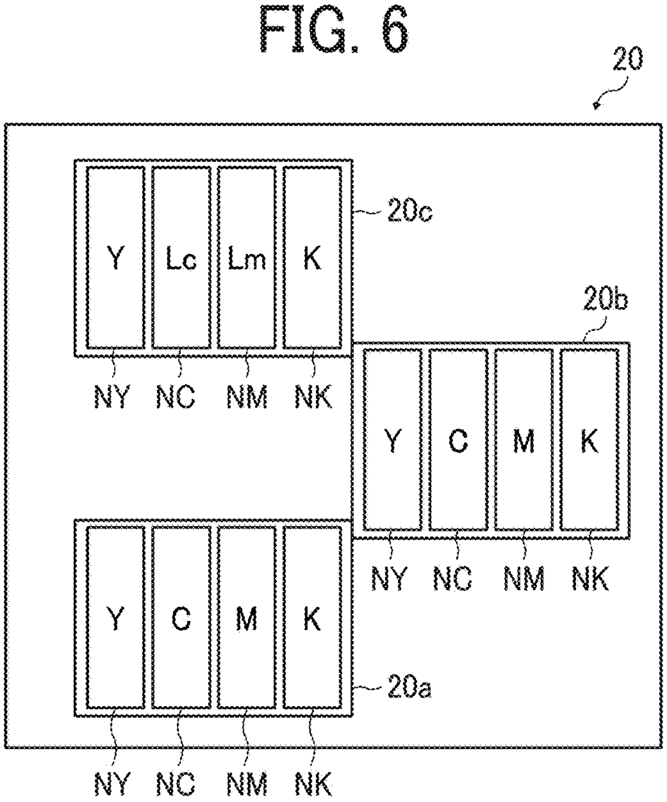
FIG. 6 is a schematic diagram illustrating an example of the color of each nozzle array.

FIG. 5 is a plan view illustrating the nozzle configuration of the printing head 20 and FIG. 6 is a schematic diagram illustrating the color of each nozzle array. FIG. 5 is a top view of the nozzle array of the printing head 20. As illustrated in FIG. 5, the printing head 20 includes a first nozzle group 20*a*, a second nozzle group 20*b*, and a third nozzle group 20*c*. The number of nozzle groups is not limited to three. Four or more groups can be configured.

As illustrated in FIG. 5, the nozzle groups 20*a*, 20*b*, and 20*c* are arranged alternately in two rows in the main scanning direction and in a zigzag manner in the sub-scanning direction. That is, the nozzle groups 20*a*, 20*b*, and 20*c* are arranged in a non-overlapping manner in the order of the third nozzle group 20*c*, the second nozzle group 20*b*, and the first nozzle group 20*a* from the upstream to the downstream in the conveyance direction A of the printing medium 40. As illustrated in FIG. 5, the second nozzle group 20*b* is positioned shifted from the first nozzle group 20*a* and the third nozzle group 20*c* in the main scanning direction.

Each of the first nozzle group 20*a*, the second nozzle group 20*b*, and the third nozzle group 20*c* includes four nozzle arrays that discharge ink droplets of CMYK (process colors) for image formation. Each nozzle array has 192 nozzle orifices from the nozzle orifice number 1 to the nozzle orifice number 192. In the embodiment illustrated in FIG. 5, the nozzle orifices are numbered from the number 1 to the number 192 from the downstream to the upstream in the conveyance direction A of the printing medium 40. The pitch P between the nozzle orifices is 150 dots per inch (dpi).

As illustrated in FIG. 5, each of the first nozzle group 20*a*, the second nozzle group 20*b*, and the third nozzle group 20*c* includes a yellow ink nozzle array NY for discharging yellow (Y) ink droplets, a cyan ink nozzle array NC for discharging cyan (C) ink droplets, a magenta ink nozzle array NM for discharging magenta (M) ink droplets, and a black ink nozzle array NK for discharging black (K) ink droplets.

As described above, since the nozzle groups 20*a*, 20*b*, and 20*c* have the same number of nozzle arrays and the same number of nozzles, the nozzle groups 20*a*, 20*b*, and 20*c* can be configured with the same components. The number of types of components can be reduced accordingly, which leads to the cost reduction of a device. In addition, the number of the nozzle groups is not limited to three. A configuration of four or more groups is possible.

One embodiment of the present disclosure is illustrated in FIG. 6.

In the present embodiment, as illustrated in FIG. 6, a light cyan ink (Lc) and a light magenta ink (Lm) are used as inks other than the process color inks. However, the inks other than the process colors are not limited thereto. The inks include light inks of yellow or and black.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Hereinafter, the present disclosure is described in more detail based on Examples, but the technical scope of the present disclosure is not limited to thereto.

Preparation of Ink

The raw materials listed in Table 1 were added at room temperature while being stirred. Subsequent to uniform mixing, the mixture obtained was filtered under pressure with a polyvinilydene fluoride membrane filter having an average opening diameter of 0.8 μm to remove coarse particles and dust to obtain ink.

In Examples, cyan ink and magenta ink were used as pairs of dark ink and light ink. Yellow ink and black ink were also prepared. However, since both inks little affect the evaluation, the detailed description of the inks are omitted.

TABLE 1

| Component | | Dark ink No. | |
|---|---|---|---|
| Category | Component | 1 | 2 |
| Humectant | 1,2-propane diol | 20.00 | 20.00 |
| Penetrant | Diethylene glycol-n-butylether | 10.00 | 10.00 |
| Surfactant | Silicone-based surfactant | 2.00 | 2.00 |
| Antibacterial agent | PROXEL LV | 0.10 | 0.10 |
| Solvent | Water | Balance | Balance |
| Resin | Polycarbonate-based urethane resin emulsion | 15.00 | 15.00 |
| Coloring material | Liquid dispersion of cyan pigment (pigment content of 15 percent) | 6.67 | |
| | Liquid dispersion of magenta pigment (pigment content of 15 percent) | | 13.33 |
| Total | | 100 | 100 |
| Pigment content (percent by mass) | | 1.00 | 2.00 |

| Component | | Light ink No. | | | | | |
|---|---|---|---|---|---|---|---|
| Category | Component | 1 | 2 | 3 | 4 | 5 | 6 |
| Humectant | 1,2-propane diol | 20.00 | 20.00 | 20.00 | 20.00 | 20.00 | 20.00 |
| Penetrant | Diethylene glycol-n-butylether | 10.00 | 10.00 | 10.00 | 10.00 | 10.00 | 10.00 |
| Surfactant | Silicone-based surfactant | 2.00 | 2.00 | 2.00 | 2.00 | 2.00 | 2.00 |

TABLE 1-continued

| | | | | | | | |
|---|---|---|---|---|---|---|---|
| Antibacterial agent | PROXEL LV | 0.10 | 0.10 | 0.10 | 0.10 | 0.10 | 0.10 |
| Solvent | Water | Balance | Balance | Balance | Balance | Balance | Balance |
| Resin | Polycarbonate-based urethane resin emulsion | 17.00 | 15.00 | 15.00 | 20.00 | 17.00 | 15.00 |
| Coloring material | Liquid dispersion of cyan pigment (pigment content of 15 percent) | 0.67 | 2.67 | 3.33 | | | |
| | Liquid dispersion of magenta pigment (pigment content of 15 percent) | | | | 0.33 | 2.00 | 2.67 |
| Total | | 100 | 100 | 100 | 100 | 100 | 100 |
| Pigment content (percent by mass) | | 0.10 | 0.40 | 0.50 | 0.05 | 0.30 | 0.40 |

The arrangements of the ink droplets discharged from the nozzle groups illustrated in FIG. 5 were as follows.

Examples 1 and 2, Comparative Examples 1 and 2, and Comparative Example 3 respectively employ the ink arrangement 1, the ink arrangement 2, and the ink arrangement 3.

Ink Arrangement 1

Head 20*c* Four arrays (rows) from left to right in the order of Y, Lc, Lm, and K (dark ink+light ink)

Head 20*b* Four rows from left to right in the order of Y, C, M, and K (dark ink)

Head 20*a* Four rows from left to right in the order of Y, C, M, and K (dark ink)

Ink Arrangement 2

Head 20*c* Four rows from left to right in the order of C, M, and K (dark ink)

Head 20*b* Four rows from left to right in the order of Y, C, M, and K (dark ink)

Head 20*a* Four rows from left to right in the order of Y, Lc, Lm, and K (dark ink+light ink)

Ink Arrangement 3

Head 20*c* Four rows from left to right in the order of Y, C, M, and K (dark ink)

Head 20*b* Four rows from left to right in the order of Y, C, M, and K (dark ink)

Head 20*a* Four rows from left to right in the order of C, M, and K (dark ink) "From left" refers to "from left" in FIGS. 5 and 6.

The arrangement of the inks of Examples and Comparative Examples are shown in Table 2.

Figure 7:
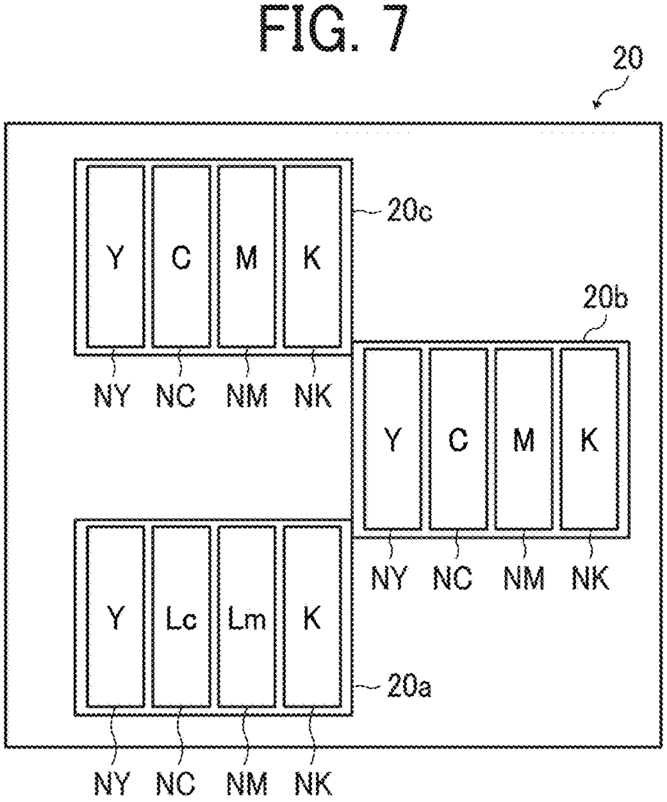
FIG. 7 is a schematic diagram illustrating an example of the color of each nozzle array.
Figure 8:
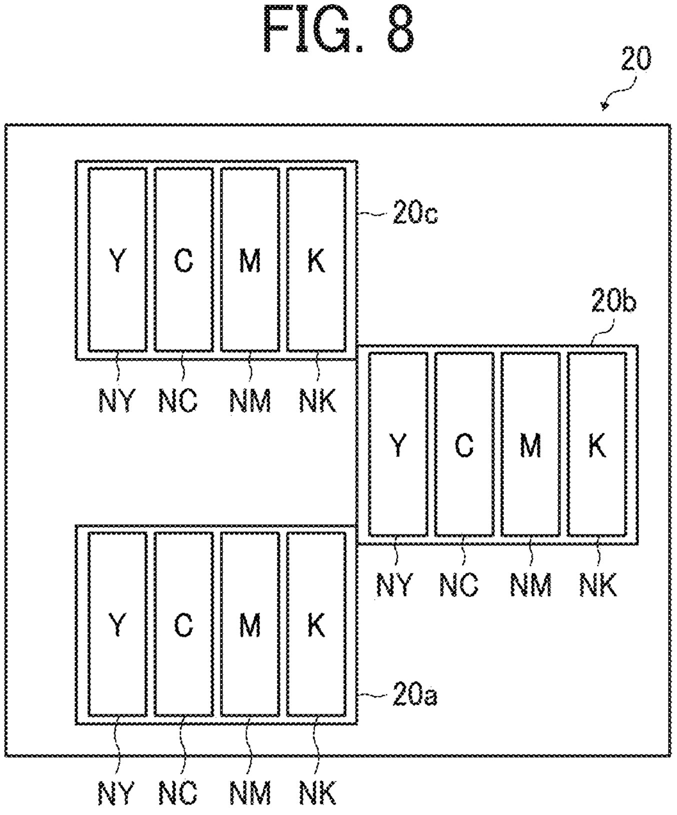
FIG. 8 is a schematic diagram illustrating an example of the color of each nozzle array.

The ink arrangement 1, the ink arrangement 2, and the ink arrangement 3 are respectively illustrated in FIGS. 6, 7, and 8.

TABLE 2

| | | | Example 1 | Example 2 |
|---|---|---|---|---|
| Head 20c | nozzle array 1 | Y | Y ink | Y ink |
| | nozzle array 2 | C | Light ink 1 (Lc) | Light ink 2 (Lc) |
| | nozzle array 3 | M | Light ink 5 (Lm) | Light ink 6 (Lm) |
| | nozzle array 4 | K | K ink | K ink |
| Head 20b | nozzle array 1 | Y | Y ink | Y ink |
| | nozzle array 2 | C | Dark ink 1 | Dark ink 1 |
| | nozzle array 3 | M | Dark ink 2 | Dark ink 2 |
| | nozzle array 4 | K | K ink | K ink |
| Head 20a | nozzle array 1 | Y | Y ink | Y ink |
| | nozzle array 2 | C | Dark ink 1 | Dark ink 1 |
| | nozzle array 3 | M | Dark ink 2 | Dark ink 2 |
| | Nozzle array 4 | K | K ink | K ink |

TABLE 2-continued

| | | | Comparative Example 1 | Comparative Example 2 | Comparative Example 3 |
|---|---|---|---|---|---|
| Head 20c | nozzle array 1 | Y | Y ink | Y ink | Y ink |
| | nozzle array 2 | C | Dark ink 1 | Dark ink 1 | Dark ink 1 |
| | nozzle array 3 | M | Dark ink 2 | Dark ink 2 | Dark ink 2 |
| | nozzle array 4 | K | K ink | K ink | K ink |
| Head 20b | nozzle array 1 | Y | Y ink | Y ink | Y ink |
| | nozzle array 2 | C | Dark ink 1 | Dark ink 1 | Dark ink 1 |
| | nozzle array 3 | M | Dark ink 2 | Dark ink 2 | Dark ink 2 |
| | nozzle array 4 | K | K ink | K ink | K ink |
| Head 20a | nozzle array 1 | Y | Y ink | Y ink | Y ink |
| | nozzle array 2 | C | Light ink 3 (Lc) | Light ink 1 (Lc) | Dark ink 1 |
| | nozzle array 3 | M | Light ink 4 (Lm) | Light ink 5 (Lm) | Dark ink 2 |
| | Nozzle array 4 | K | K ink | K ink | K ink |

The pigment content, pigment content ratio, and resin particle content ratio of Examples and Comparative Examples shown in Table 2 are listed in Table 3. The evaluation results on the granularity below are shown in Table 3.

Evaluation on Granularity 4C composite images, four-color-overlapped images, were printed with the inkjet printing device illustrated in FIG. 3 using each ink set.

The images were printed on polyvinyl chloride film (CPPVW 1300, manufactured by SAKURAI CO., LTD.) with the inkjet printing device mentioned above.

The liquid discharging unit of the inkjet printing device illustrated in FIG. 3 was used, including a plurality of nozzle groups each having a nozzle array having nozzle orifices for discharging liquid of at least one process color for image formation in the sub-scanning direction perpendicular to the main scanning direction and a nozzle array having nozzle orifices for discharging liquid of a color different from the at least one process color arranged in the sub-scanning direction as illustrated in FIG. 5. The nozzle groups are arranged in such a manner that three of the nozzle arrays that discharge liquid of a color different from the at least one process color are arranged in the sub-scanning direction as illustrated in FIG. 5.

The output 4C composite images had graduation from 0 percent to 100 percent (solid image). These images were visually checked and evaluated on granularity based on the following criteria, A- or B-rated image is usable for practical purpose. The results are shown in Table 3.

Evaluation Criteria

A: No granularity was visibly present at a distance from 30 cm to less than 1 in from the image B: No granularity was visibly present at a distance from 1 m to less than 3 m from the image C: Granularity was present at a distance of 3 m or more

TABLE 3

| | | | Example 1 | | Example 2 | | Comparative Example 1 | | Comparative Example 2 | | Comparative Example 3 | |
|---|---|---|---|---|---|---|---|---|---|---|---|---|
| Name of head | Nozzle array No. | Name of ink | Ink type | Pigment content | Ink type | Pigment content | Ink type | Pigment content | Ink type | Pigment content | Ink type | Pigment content |
| Head 20c | Nozzle array 1 | Y | Y ink | | Y ink | | Y ink | | Y ink | | Y ink | |
| | Nozzle array 2 | C | Light ink 1 | 0.10 | Light ink 2 | 0.40 | Dark ink 1 | 1.00 | Dark ink 1 | 1.00 | Dark ink 1 | 1.00 |
| | Nozzle array 3 | M | Light ink 5 | 0.30 | Light ink 6 | 0.40 | Dark ink 2 | 2.00 | Dark ink 2 | 2.00 | Dark ink 2 | 2.00 |
| | Nozzle array 4 | K | K ink | | K ink | | K ink | | K ink | | K ink | |
| Head 20b | Nozzle array 1 | Y | Y ink | | Y ink | | Y ink | | Y ink | | Y ink | |
| | Nozzle array 2 | C | Dark ink 1 | 1.00 | Dark ink 1 | 1.00 | Dark ink 1 | 1.00 | Dark ink 1 | 1.00 | Dark ink 1 | 1.00 |
| | Nozzle array 3 | M | Dark ink 2 | 2.00 | Dark ink 2 | 2.00 | Dark ink 2 | 2.00 | Dark ink 2 | 2.00 | Dark ink 2 | 2.00 |
| | Nozzle array 4 | K | K ink | | K ink | | K ink | | K ink | | K ink | |
| Head 20a | Nozzle array 1 | Y | Y ink | | Y ink | | Y ink | | Y ink | | Y ink | |
| | Nozzle array 2 | C | Dark ink 1 | 1.00 | Dark ink 1 | 1.00 | Light ink 3 | 0.5 | Light ink 1 | 0.10 | Dark ink 1 | 1.00 |
| | Nozzle array 3 | M | Dark ink 2 | 2.00 | Dark ink 2 | 2.00 | Light ink 4 | 0.05 | Light ink 5 | 0.30 | Dark ink 2 | 2.00 |
| | Nozzle array 4 | K | K ink | | K ink | | K ink | | K ink | | K ink | |
| Pigment content ratio | Light ink (Lc)/dark ink (L) | | | 10 to 100 | | 40 to 100 | | 50 to 100 | | 5 to 100 | | |
| | Light ink (Lm)/dark ink (M) | | | 15 to 100 | | 20 to 100 | | 2.5 to 100 | | 15 to 100 | | |
| | Light ink (Lc)/dark ink (L) | | | 1.1 | | 1.0 | | 1.0 | | 1.1 | | |
| Resin particle content ratio | Light ink (Lm)/dark ink (M) | | | 1.1 | | 1.0 | | 1.3 | | 1.1 | | |
| Evaluation | Granularity | | A | | B | | C | | C | | C | |

The present disclosure relates to the inkjet printing device of the following 1 and also includes the following 2 to 4 as embodiments.

1. The inkjet printing device includes a dark ink container containing a dark ink of a color, a light ink container containing a light ink of the color, a dark ink discharging nozzle group for discharging the dark ink, and a light ink discharging nozzle group for discharging the light ink, wherein the light ink discharging group is disposed upstream of the dark ink discharging group in a sub-scanning direction, wherein the following Relationship 1 is satisfied: 10/100≤a ratio of a pigment content in the light ink to a pigment content in the dark ink≤40/100 Relationship 1.

2. The inkjet printing device according to 1 mentioned above, the total of at least three of the one or more dark ink discharging nozzle arrays and the one or more light ink discharging nozzle arrays are disposed in the sub-scanning direction.

3. The inkjet printing device according to 1 or 2 mentioned above, wherein the dark ink contains at least one member selected from the group consisting of black ink, cyan ink, magenta ink, and yellow ink, wherein the light ink comprises at least one member selected from the group consisting of gray ink, light cyan ink, light magenta ink, and light yellow ink.

4. The inkjet printing device according to any one of 1 to 3 mentioned above, wherein the following Relationship 2 is satisfied:

The concentration in percent by mass of a resin in the light ink≥thet concentration in percent by mass of the resin in the dark ink Relationship 2

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An inkjet printing device comprising:

a dark ink container containing a dark ink of a color;

a light ink container containing a light ink of the color;

a dark ink discharging nozzle group configured to discharge the dark ink; and a light ink discharging nozzle group configured to discharge the light ink, wherein the light ink discharging nozzle group is disposed upstream of the dark ink discharging nozzle group in a sub-scanning direction, wherein the following Relationship 1 is satisfied:

10/100≤a ratio of a pigment content in the light ink to a pigment content in the dark ink≤40/100 Relationship 1; and wherein the dark ink discharging nozzle group and the light ink discharging nozzle group each includes a nozzle array including one or more ink discharging nozzles, wherein the number of the dark ink discharging nozzle group and the light ink discharging nozzle group that are disposed in the sub-scanning direction is at least three in total.

2. The inkjet printing device according to claim 1, wherein the dark ink comprises at least one member selected from the group consisting of black ink, cyan ink, magenta ink, and yellow ink, wherein the light ink comprises at least one member selected from the group consisting of gray ink, light cyan ink, light magenta ink, and light yellow ink.

3. The inkjet printing device according to claim 1, wherein the following Relationship 2 based on percent by mass is satisfied:

a concentration of a solid resin portion in the light ink≥a concentration of a solid resin portion in the dark ink Relationship 2.

* * * * *